United States Patent
Piccirillo et al.

(10) Patent No.: US 11,508,980 B2
(45) Date of Patent: Nov. 22, 2022

(54) SYSTEMS AND METHODS FOR DISTRIBUTED FAULT MANAGEMENT IN FUEL CELL SYSTEMS

(71) Applicant: CUMMINS ENTERPRISE LLC, Indianapolis, IN (US)

(72) Inventors: John Guido Piccirillo, Glenville, NY (US); Rebecca Dinan Zoracki, Ballston Spa, NY (US); Patrick Hammel Hart, Ballston Lake, NY (US); Ralph Teichmann, Niskayuna, NY (US); Honggang Wang, Clifton Park, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 1295 days.

(21) Appl. No.: 15/400,190

(22) Filed: Jan. 6, 2017

(65) Prior Publication Data
US 2018/0198143 A1    Jul. 12, 2018

(51) Int. Cl.
H01M 8/04992    (2016.01)
G06Q 10/00    (2012.01)
H01M 8/04664    (2016.01)

(52) U.S. Cl.
CPC ........ *H01M 8/04992* (2013.01); *G06Q 10/20* (2013.01); *H01M 8/04664* (2013.01); *H01M 8/04679* (2013.01); *H01M 8/04686* (2013.01)

(58) Field of Classification Search
None
See application file for complete search history.

(56) References Cited

U.S. PATENT DOCUMENTS

| | | | |
|---|---|---|---|
| 6,387,556 B1 | 5/2002 | Fuglevand et al. | |
| 8,244,382 B2 | 8/2012 | Wang et al. | |

(Continued)

FOREIGN PATENT DOCUMENTS

| | | |
|---|---|---|
| CN | 105680071 | 5/1998 |
| CN | 102623728 A | 8/2012 |

(Continued)

OTHER PUBLICATIONS

Boccaletti, Chiara et al., "A Software Tool for the Evaluation of Solid Oxide Fuel Cells Systems," 2008 International Conference on Electrical Machines (ICEM), Vilamoura, Portugal, Sep. 6-9, 2008, Paper ID 835, 6 pp.

(Continued)

*Primary Examiner* — Eli S Mekhlin
(74) *Attorney, Agent, or Firm* — Barnes & Thornburg LLP

(57) ABSTRACT

A distributed fault management system includes at least one sensor associated with a fuel cell system and at least one first fault management computing device coupled to the at least one sensor. The at least one first fault management computing device is configured to receive data associated with a first fault condition. The at least one first fault management computing device is further configured to generate a resolution to the first fault condition and transmit at least one resolution command signal to at least one second fault management computing device. The at least one resolution command signal configures the at least one second fault management computing device to use the resolution to resolve a second fault condition in a similar manner.

28 Claims, 4 Drawing Sheets

(56) References Cited

U.S. PATENT DOCUMENTS

| | | | |
|---|---|---|---|
| 8,333,125 B2 | 12/2012 | Tsai et al. | |
| 9,070,918 B2 | 6/2015 | Schade | |
| 2006/0115693 A1* | 6/2006 | Toth | H01M 8/04992 |
| | | | 429/413 |
| 2007/0059583 A1 | 3/2007 | Vinsant | |
| 2008/0138677 A1 | 6/2008 | Edlund | |
| 2008/0145727 A1* | 6/2008 | Faidi | H01M 8/04664 |
| | | | 429/450 |
| 2008/0278183 A1 | 11/2008 | Mcclelland et al. | |
| 2009/0037206 A1* | 2/2009 | Byrne | G06Q 10/06 |
| | | | 705/305 |
| 2014/0154601 A1 | 6/2014 | Schade | |
| 2015/0207562 A1* | 7/2015 | Brumley, II | G06N 5/022 |
| | | | 398/125 |
| 2018/0131021 A1* | 5/2018 | Li | H01M 8/0432 |
| 2019/0018067 A1* | 1/2019 | Kong | H01M 8/0432 |

FOREIGN PATENT DOCUMENTS

| | | |
|---|---|---|
| JP | H10-116625 A | 5/1998 |
| JP | 2007305327 | 11/2007 |
| KR | 101145591 B1 | 5/2012 |

OTHER PUBLICATIONS

Viljoen, Marius et al., "Graphical User Interface Control for a Solar/Battery/Hydrogen/Fuel Cell Power Plant," AFRICON 2013, Pointe-Aux-Piments, Mauritius, Sep. 9-12, 2013, 5 pp.

\* cited by examiner

SYSTEMS AND METHODS FOR DISTRIBUTED FAULT MANAGEMENT IN FUEL CELL SYSTEMS

BACKGROUND

The field of the disclosure relates generally to fuel cell systems and, more particularly, to a system and method for distributed fault management using a plurality of fuel cell systems.

Fuel cells are electrochemical energy conversion devices that have demonstrated a potential for relatively high efficiency and low pollution in power generation. A fuel cell generally provides a direct current (DC) which is converted to alternating current (AC) through an inverter. The DC or AC voltage is used to power motors, lights, and any number of electrical devices and systems. Fuel cells operate in stationary, semi-stationary, or portable applications.

A fuel cell produces electricity by electrochemically combining a fuel and an oxidant across an ionic conducting layer. This ionic conducting layer, also labeled the electrolyte of the fuel cell, is a liquid or solid. Fuel cells are typically amassed in electrical series in an assembly of fuel cells to produce power at useful voltages or currents. Therefore, interconnect structures are used to connect or couple adjacent fuel cells in series or parallel to form a fuel cell stack. In general, components of a fuel cell include the electrolyte, an anode, and a cathode. The reactions that produce electricity generally take place at the anode and cathode where a catalyst is typically disposed to speed the reactions. The anode and cathode are constructed to include channels and porous layers to increase the surface area for the chemical reactions to occur. The electrolyte carries electrically charged particles between the anode and cathode and is otherwise substantially impermeable to both fuel and oxidant.

The energy generation systems based on fuel cells are complex since they involve thermal, fluidic, and electrochemical phenomena. Moreover, they need a set of auxiliary elements, such as valves, compressor, sensors, and regulators, to make the fuel cell operate at a pre-established optimal operating point. For these reasons, they are vulnerable to fuel cell partial failures (also called "faults") that can cause performance degradation, stoppage, or permanent damage of a fuel cell.

Many known fuel cell systems located in different locations encounter similar fault conditions and require human intervention to correct for the fault conditions. Moreover, since many known fuel cell systems lack adaptive cognitive features, including adaptive learning features, subsequent corrections for unanticipated real-world, real-time events need to be directed by a human agent.

BRIEF DESCRIPTION

In one aspect, a distributed fault management system is provided. The fuel cell fault management system includes at least one sensor associated with a fuel cell system and at least one first fault management computing device and at least one second fault management computing device. The at least one first fault management computing device is coupled to the at least one sensor. The at least one first fault management computing device is configured to receive measurement data from the at least one sensor. The measurement data includes data associated with a first fault condition. The at least one first fault management computing device is further configured to generate a resolution to the first fault condition. The at least one first fault management computing device is also configured to generate at least one resolution command signal based on the resolution to the first fault condition. The at least one first fault management computing device is also configured to transmit the at least one resolution command signal to at least one second fault management computing device. The fuel cell fault management system further includes the at least one second fault management computing device configured to receive the at least one resolution command signal. The at least one resolution command signal configures the at least one second fault management computing device to implement the resolution to resolve a second fault condition in a similar manner. The second fault condition is similar to the first fault condition.

In another aspect, a method for controlling a distributed fault management system is provided. The distributed fault management system includes at least one sensor associated with a fuel cell system and at least one first fault management computing device coupled to the at least one sensor. The method includes receiving, by the at least one first fault management computing device, measurement data from the at least one sensor. The measurement data includes data associated with a first fault condition. The method further includes generating, by the at least one first fault management computing device, a resolution to the first fault condition. The method also includes generating, by the at least one first fault management computing device, at least one resolution command signal based on the resolution to the first fault condition. The method further includes transmitting, by the at least one first fault management computing device, the at least one resolution command signal to at least one second fault management computing device. The at least one resolution command signal configures the at least one second fault management computing device to implement the resolution to resolve a second fault condition in a similar manner. The second fault condition is similar to the first fault condition.

In yet another aspect, a non-transitory computer-readable storage medium having computer-executable instructions embodied thereon is provided. When executed by at least one first fault management computing device coupled to at least one sensor associated with a fuel cell system, the computer-executable instructions cause the at least one first fault management computing device to receive measurement data from the at least one sensor. The measurement data includes data associated with a first fault condition. The computer-executable instructions further cause the at least one first fault management computing device to generate a resolution to the first fault condition. The computer-executable instructions also cause the at least one first fault management computing device to generate at least one resolution command signal based on the resolution to the first fault condition. The computer-executable instructions further cause the at least one first fault management computing device to transmit the at least one resolution command signal to at least one second fault management computing device. The at least one resolution command signal configures the at least one second fault management computing device to implement the resolution to resolve a second fault condition in a similar manner. The second fault condition is similar to the first fault condition.

DRAWINGS

These and other features, aspects, and advantages of the present disclosure will become better understood when the following detailed description is read with reference to the accompanying drawings in which like characters represent like parts throughout the drawings, wherein.

Figure 1:
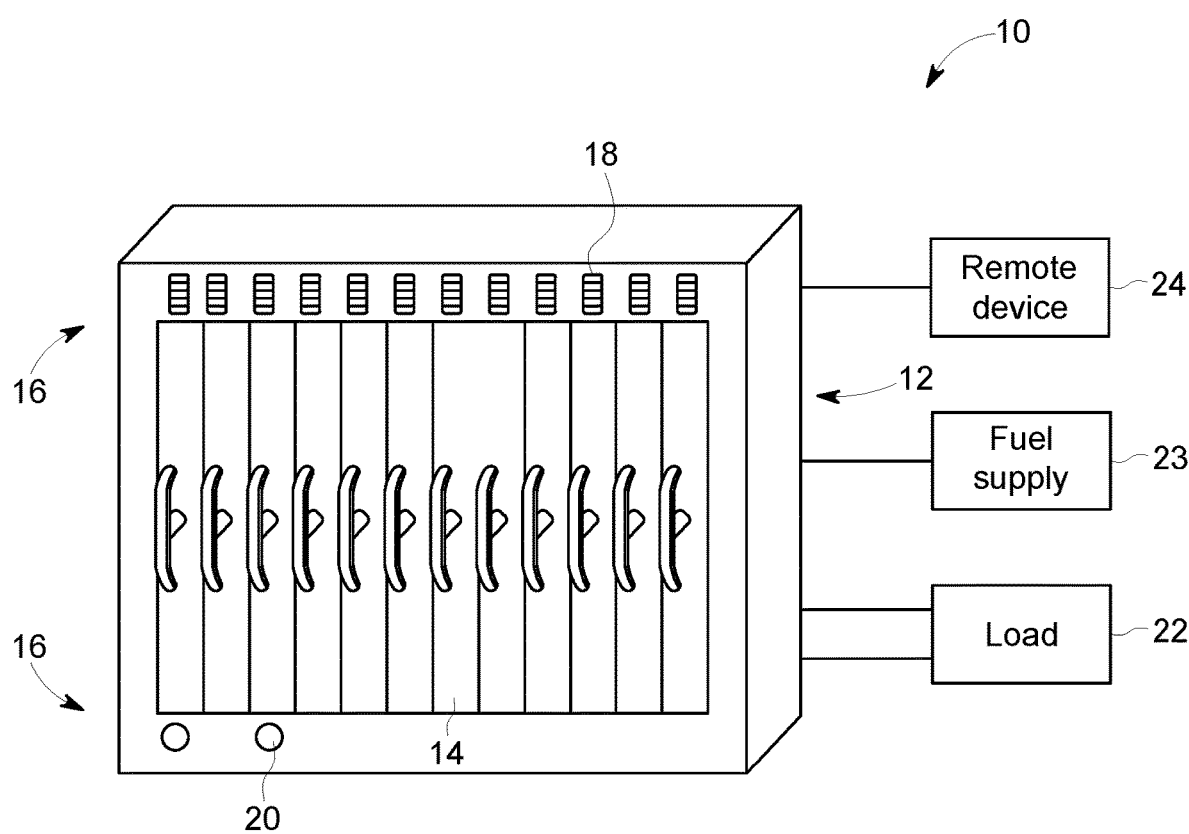
FIG. 1 is a prospective view of an exemplary fuel cell system coupled to a fault management computing device.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "intelligence" and "intelligent" are intended to be descriptive of any computer-implemented programs and computer-based systems that are implemented such that they demonstrably exhibit abilities, including, without limitation, attention, abstract thought, understanding, communication, reasoning, learning, planning, emotional intelligence and/or problem solving.

As used herein, the terms "cognitive" and "cognition" are intended to be descriptive of any computer-implemented programs and computer-based systems that execute processes that include, without limitation, continuous learning, adaptation, planning, remembering, forgetting, language, memory structure, perception, communicating, deliberating, applying knowledge, solving problems, making decisions, changing preferences, sensory input, internal thinking, and reflex actions. Cognition, or cognitive processes, can be artificial including states of intelligent entities, such as, highly autonomous machines and artificial intelligences that have the ability to process, e.g., take into consideration, feedback from the environment.

As used herein, the terms "intelligent system", "artificial intelligence", "intelligent agent", and "artificial consciousness" are intended to be representative of, without limitation, any computer-implemented programs and computer-based systems that perceive their environments, independently determine courses of action, and take the actions that will maximize the chances of success.

As used herein, the term "SVM clustering" is intended to be representative of any computer-implemented and computer-based methods that use an SVM-based clustering algorithm to classify and categorize data according to the attributes of the data. Such attributes may be predefined, including each attribute having a predefined relevance, and the clustering algorithm will cluster according to the predefined attributes and their degree of relevance. Such SVM clustering algorithms are typically referred to as "supervised" SVM algorithms and require external support for their training. Alternatively, such attributes may be undefined and the clustering algorithm will self-determine such attributes, sort accordingly, and review the sorted data for attribute consistency, thereby performing self-training. Such SVM clustering algorithms are typically referred to as "non-parametric" SVM algorithms and require little to no external support for their training.

As used herein, the term "genetic algorithm (GA)" is intended to be representative of any portion of computer-implemented programs and computer-based systems that includes a search heuristic that emulates the process of natural evolution to generate useful resolutions to optimization and search problems.

As used herein, the term "heuristic" is intended to be representative of any portion of computer-implemented programs and computer-based systems that uses experience-based techniques for problem solving, learning, and discovery.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The embodiments of distributed fault management systems for distributed fault management using a plurality of fuel cell systems, as described herein, overcome a number of deficiencies of known distributed fault management systems and provide a cost-effective method for managing fault conditions on such fuel cell systems. Specifically, the embodiments described herein include fuel cell systems associated with fault management computing devices. A fault management computing device includes a memory and a processor in communication with a fuel cell system and a communication network. The fault management computing device is configured to use artificial intelligence and/or machine learning to determine resolutions to fault conditions detected in fuel cells and fuel cell components, and communicate the fault condition resolution as a resolution command signal to a plurality of fault management computing devices. The resolution command signal configures the plurality of fault management computing devices to use the fault condition resolution to respond to a same or a similar fault condition when detected in fuel cell systems. Therefore, the embodiments described herein enable fuel cell systems to dynamically and adaptively resolve fault conditions and share resolutions to the fault conditions with other fuel cell systems, thereby improving the performance of some partially failed fuel cells.

FIG. 1 is an exemplary configuration of a fuel cell system 10. The depicted configuration of fuel cell system 10 (also known as a "fuel cell power system") is exemplary and other configurations are possible. As shown, fuel cell system 10 includes a housing 12 provided about a plurality of fuel cell cartridges 14. Housing 12 defines a subrack assembly in the exemplary embodiment.

Fuel cell system 10 is configured to utilize one or more fuel cell cartridges 14. Twelve such fuel cell cartridges 14 are utilized in the embodiment of fuel cell system 10 described herein. As described below, individual fuel cell cartridges 14 include a plurality of fuel cells. In the described configuration, individual fuel cell cartridges 14 include four fuel cells. Such fuel cells include proton exchange membrane fuel cells (also known as PEM fuel cells and polymer electrolyte membrane fuel cells), membrane electrode assembly (MEA) fuel cells, membrane electrode diffusion assembly (MEDA) fuel cells, solid oxide fuel cells (SOFCs), phosphoric acid fuel cells (PAFCs), hydrogen-oxygen fuel cells, molten carbonate fuel cells (MCFCs), and the like.

Housing 12 additionally includes an operator interface 16. In the exemplary embodiment, operator interface 16 includes a display 18 and interface switches 20. Operator interface 16 is configured to indicate operation of fuel cell system 10 and also enable an operator to control various functions of fuel cell system 10.

Display 18 of operator interface 16 is configured to emit a human perceptible signal, such as visible signals, to indicate operation of fuel cell system 10. In the exemplary embodiment, display 18 includes a plurality of light emitting diode (LED) bar graph arrays to indicate operational conditions of respective fuel cell cartridges 14. In one configuration, individual bar graph arrays of display 18 indicate high and low voltages of fuel cells within the corresponding fuel cell cartridge 14.

Interface switches 20 permit a user to control operations of fuel cell system 10. For example, one interface switch 20 enables a user to turn on fuel cell system 10. In addition, another interface switch 20 includes a load enable switch which permits a user to selectively apply power from fuel cell system 10 to a load 22 coupled with the fuel cell system 10. Another interface switch 20 controls a cartridge reset function as described below.

Fuel cell system 10 is shown coupled with a computing device 24. In the exemplary embodiment, computing device 24 is a fault management computing device, as described herein. In alternative embodiments, computing device 24 includes an off-site control and monitoring station. Fuel cell system 10 is configured to communicate with computing device 24. Fuel cell system 10 receives communications from computing device 24 which may include data and commands. Fuel cell system 10 is also configured to output data, requests, etc. to computing device 24.

Figure 2:
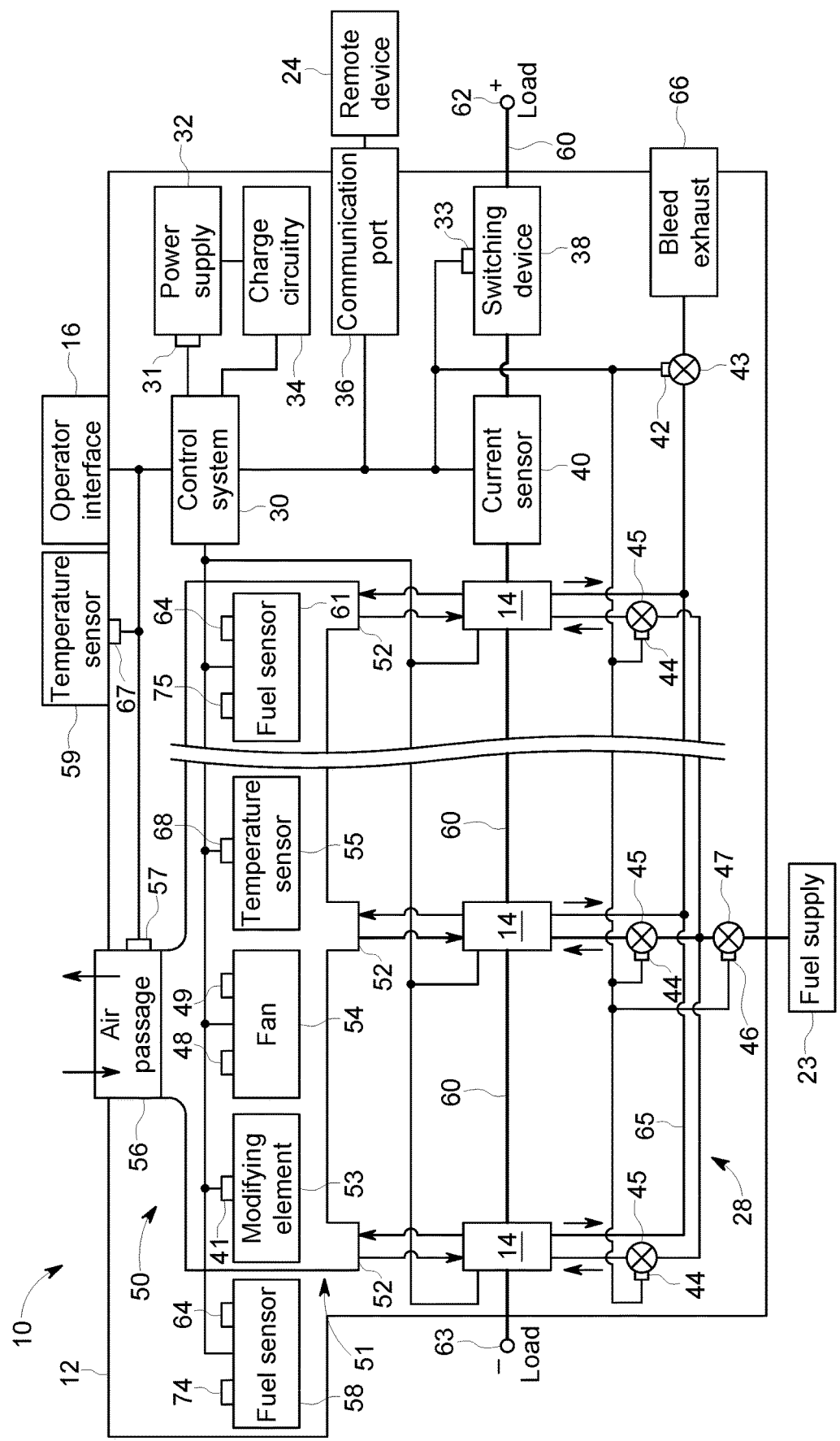
FIG. 2 is a block diagram of a control system, including a fault management computing device, coupled with components of the fuel cell system shown in FIG. 1.

FIG. 2 is a block diagram of a fuel cell control system, including a computing device 24, coupled with components of fuel cell system 10. In the exemplary embodiment, computing device 24 is a fault management computing device, as described herein. The components are internal and external of housing 12 of fuel cell system 10. Internally, only three fuel cell cartridges 14 are shown. More fuel cell cartridges 14 are provided in typical configurations. Additionally fuel cell cartridges 14 typically include numerous sensors for measuring critical operating characteristics of the fuel cell and numerous actuators for modulating the fuel and oxidizer gas flows.

Fuel cell system 10 is coupled with computing device 24. Fuel cell system 10 receives communications from computing device 24 which includes data and commands. Fuel cell system 10 is also configured to output data, requests, etc. to computing device 24. The depicted components include the plural fuel cell cartridges 14 and operator interface 16 discussed above. In addition, fuel cell system 10 includes a control system 30. One configuration of control system 30 is described below in detail. Control system 30 is coupled with a power supply sensor 31 associated with a power supply 32, and charge circuitry 34. Control system 30 is additionally coupled with fuel cell cartridges 14 and operator interface 16. Further, control system 30 is coupled with a communication port 36, switching device 38 and current sensor 40. Control system 30 is additionally coupled with a bleed solenoid 42 associated with a bleed valve 43.

The depicted fuel cell system 10 includes a fuel delivery system 28. Fuel delivery system 28 couples with a fuel supply 23 to supply fuel to fuel cell cartridges 14. Exemplary fuel includes hydrogen gas. Other fuels for fuel cells including diesel, methanol, chemical hydrides, natural gases, and biogases. Other fuels may also be possible.

The depicted fuel delivery system 28 includes a main valve 47 and plural auxiliary valves 45 associated with respective fuel cell cartridges 14. Main valve 47 controls the flow of fuel from fuel supply 23 into fuel cell system 10. Auxiliary valves 45 control the flow of fuel to respective fuel cell cartridges 14. Control system 30 is coupled with plural auxiliary solenoids 44 of associated auxiliary valves 45. Control system 30 is further coupled with a main solenoid 46 of associated main valve 47.

Fuel cell system 10 includes an air temperature control assembly 50. Air temperature control assembly 50 includes a plenum 51 having associated ports 52 corresponding to fuel cell cartridges 14. Included within plenum 51 of air temperature control assembly 50 are temperature modifying element 53, fan 54, temperature sensor 55, and fuel sensor 61.

A controllable air flow device or air passage 56 couples plenum 51 to exterior ambient air outside of housing 12. Air passage 56 permits the intake of air into plenum 51 as well as the exhaustion of air from plenum 51. Control system 30 is coupled with control circuitry 41 of modifying element 53, fan control circuitry 48 and fan monitor circuitry 49 of fan 54, temperature circuitry 68 associated with temperature sensor 55, control circuitry 57 of air passage 56, and heater 75 of fuel sensor 61.

A first fuel sensor 58 is provided within housing 12 and outside of plenum 51. First fuel sensor 58 monitors for the presence of fuel within housing 12. A second fuel sensor 61 is provided within plenum 51 and monitors for the presence of fuel within plenum 51. Control system 30 is coupled with fuel detection circuitry 64 associated with fuel sensors 58, 61. Fuel detection circuitry 64 conditions measurements obtained from fuel sensors 58, 61.

Heaters 74, 75 are coupled with respective fuel sensors 58, 61 to provide selective heating of fuel sensors 58, 61 responsive to control from control system 30. Heaters 74, 75 are integral of fuel sensors 58, 61 in some configurations. Heaters 74, 75 are preferably provided in a predefined temperature range to assure proper operation. Other configurations of fuel sensors 58, 61 are possible.

In one embodiment, an external temperature sensor 59 is provided outside of housing 12. Control system 30 is also coupled with temperature circuitry 67 associated with temperature sensor 59 to monitor the exterior temperature. Temperature circuitry 67 conditions signals received from temperature sensor 59.

Control system 30 is configured to at least one of control and monitor at least one operation of fuel cell system 10. During operation, fuel from fuel supply 23 is applied to main valve 47. Main valve 47 is coupled with auxiliary valves 45 as shown. Responsive to control from control system 30, main valve 47 and auxiliary valves 45 apply fuel to respective fuel cell cartridges 14. Responsive to the supply of fuel, and in the presence of oxygen, fuel cell cartridges 14 produce electrical power.

A power bus 60 couples the fuel cell cartridges 14 in series. Power bus 60 is coupled with external terminals 62, 63 which may be connected with an external load 22 (shown in FIG. 1). Terminal 62 is a positive terminal and terminal 63 is a negative terminal of fuel cell system 10.

Air temperature control assembly 50 applies oxygen to the respective fuel cell cartridges 14 through ports 52. Fuel cell cartridges 14 are individually operable to convert chemical energy into electricity. Each fuel cell cartridge 14 includes a plurality of fuel cells, each fell cell including an anode side and a cathode side. Auxiliary valves 45 apply fuel to the anode sides of the fuel cells. Plenum 51 directs air within the cathode sides of the fuel cells. Air temperature control assembly 50 provides circulated air within a predetermined temperature range. Such circulated air is one of exterior air and/or recirculated air.

Upon start-up conditions of fuel cell system 10, modifying element 53 may be controlled via control system 30 using element control circuitry 41 to either increase or decrease the temperature of air present within plenum 51. Fan 54 circulates the air within plenum 51 to respective fuel cell cartridges 14. Fan control circuitry 48 and fan monitor circuitry 49 are shown coupled with fan 54. Responsive to control from control system 30, fan control circuitry 48 controls air flow rates (e.g., speed of rotation) of fan 54. Fan monitor circuitry 49 monitors the actual air flow rates induced by fan 54 (e.g., fan monitor circuitry 49 may include a tachometer for rotational fan configurations).

Control system 30 monitors the temperature of the air within plenum 51 using temperature sensor 55. During operation, heat is generated and emitted from fuel cell cartridges 14. Thus, it may be necessary to decrease the temperature of air within plenum 51 to provide efficient operation of fuel cell system 10. Responsive to control from control system 30, air passage 56 introduces exterior air into plenum 51 and exhaust air from plenum 51 to ambient.

Control system 30 communicates with control circuitry 57 to control air passage 56. In one embodiment, air passage 56 includes a plurality of vanes and control circuitry 57 controls the position of the vanes of air passage 56 to selectively introduce exterior air into plenum 51. The vanes of air passage 56 are provided in a plurality of orientations between an open position and a closed position to vary the amount of exterior fresh air introduced into plenum 51 or the amount of air exhausted from plenum 51 responsive to control from control system 30. Air circulated within plenum 51 includes recirculated and/or fresh ambient air.

Utilizing temperature sensor 59, control system 30 also monitors the temperature of ambient air about housing 12. Control system 30 utilizes such exterior temperature information from temperature sensor 59 to control the operation of air passage 56. Temperature sensor 59 is located adjacent air passage 56 in a preferred embodiment.

As described in further detail below, control system 30 controls air flow rates of fan 54 using fan control circuitry 48. Fan monitor circuitry 49 provides air flow rate information to control system 30. Control system 30 monitors the total system voltage being delivered via power bus 60 by summing the individual cell voltages. Control system 30 monitors the electrical load being delivered via power bus 60 using current sensor 40. With knowledge of the system bus voltage and load, control system 30 calculates waste thermal power and provide a desired cooling air flow. Control system 30 also controls the air flow rates of fan 54 depending upon waste thermal power in accordance with one embodiment of fuel cell system 10.

During operation of fuel cell cartridges 14, non-fuel diluents such as cathode-side water and atmospheric constituents may diffuse from the cathode side of the fuel cell through a membrane electrode assembly of the fuel cell and accumulate in the anode side of the fuel cell. In addition, impurities in the fuel supply delivered directly to the anode side of the fuel cell also accumulate. Without intervention, these diluents may dilute the fuel sufficiently enough to degrade performance. Accordingly, the anode side of the individual fuel cells is connected to a bleed manifold 65. Bleed manifold 65 is additionally coupled with bleed valve 43.

Control system 30 selectively operates bleed solenoid 42 to selectively open and close bleed valve 43 permitting exhaustion of matter such as entrained diluents and perhaps some fuel via a bleed exhaust 66 within housing 12. Control system 30 operates to open and close bleed valve 43 on a periodic basis. The frequency of openings and closings of bleed valve 43 is determined by a number of factors, such as electrical load coupled with terminals 62, 63, etc. Although not shown, a fuel recovery system may be coupled with bleed exhaust 66 to retrieve unused fuel for recirculation or other uses.

Following a start-up condition either inputted via interface or from computing device 24, control system 30 selectively controls switching device 38 to couple power bus 60 with positive terminal 62. Switching device 38 includes parallel metal-oxide semiconductor field-effect transistors (MOSFETs) switches to selectively couple power bus 60 with an external load 22.

For example, control system 30 may verify when an appropriate operational temperature within plenum 51 has been reached utilizing temperature sensor 55. In addition, control system 30 verifies that at least one electrical characteristic, such as voltage and/or current, of respective fuel cell cartridges 14 has been reached before closing switching device 38 to couple power bus 60 with an associated load 22. Such provides proper operation of fuel cell system 10 before coupling bus 60 with an external load 22.

In the exemplary embodiment, power supply 32 includes power supplies having different voltage potentials. For example, power supply 32 provides a 5-volt supply voltage for operating the digital circuitry of fuel cell system 10, such as control system 30. Power supply 32 also provides higher voltage potentials, such as +/−12 volts for operation of components such as fan 54 within fuel cell system 10.

Further, power supply 32 includes a battery powering components during start-up procedures. Following start-up procedures, power supply 32 is coupled with power bus 60 and internal power utilized by fuel cell system 10 is derived from electrical power generated from fuel cell cartridges 14. Charge circuitry 34 is provided to selectively charge batteries of power supply 32 utilizing power from power bus 60. Control system 30 monitors electrical conditions of the batteries and the supplied voltages of power supply 32 using power supply sensors 31. Control system 30 operates charge circuitry 34 to charge batteries of power supply 32 depending upon such monitoring operations.

Control system 30 is also coupled with communication port 36 providing communications to an external device such as a computing device 24. In another embodiment, computing device 24 includes an external control system or monitoring system off-site from fuel cell system 10. Control system 30 outputs data including requests, commands, operational conditions, etc., of fuel cell system 10 using communication port 36. In addition, control system 30 receives data including commands, requests, etc., from computing device 24 using communication port 36.

Figure 3:
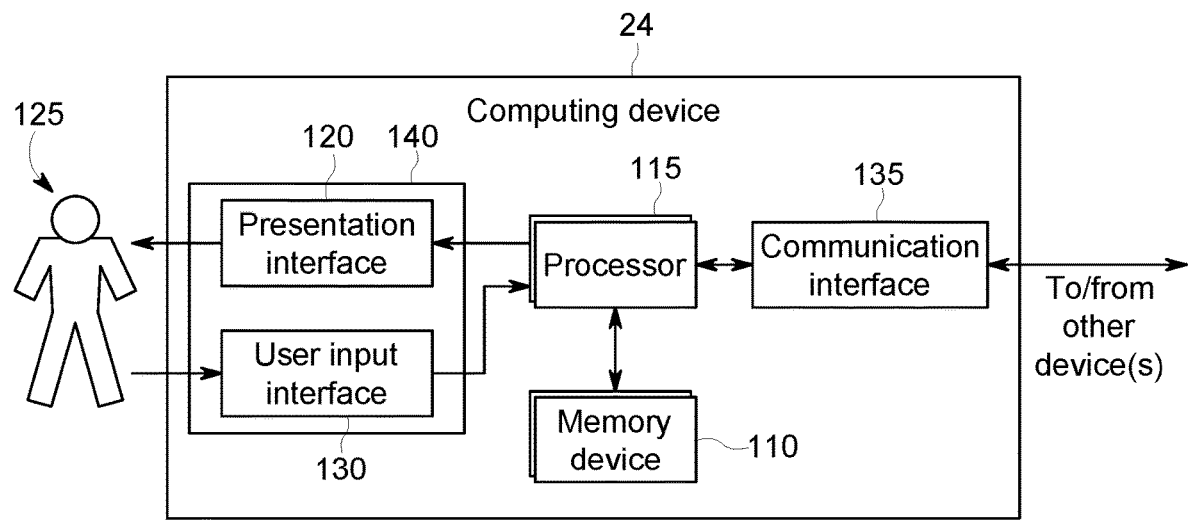
FIG. 3 is a block diagram of an exemplary fault management computing device shown in FIGS. 1 and 2.

FIG. 3 is a block diagram of an exemplary computing device 24, such as a fault management computing device. Computing device 24 is configured to use machine learning to determine a resolution to a fault condition in the fuel cell system shown in FIG. 1, communicate the resolution to one or more computing devices 24, and/or receive one or more fault condition resolutions from the one or more computing devices 24.

Computing device 24 includes a memory device 110 and a processor 115 operatively coupled to memory device 110 for executing instructions. In some embodiments, executable instructions are stored in memory device 110. Computing device 24 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media. Memory device 110 is configured to store sensor data and/or any other type data. Also, memory device 110 includes, without limitation, sufficient data, algorithms, and commands to facilitate generating data-driven solutions to fault conditions in fuel cells.

Computing device 24 receives sensor data associated with fault conditions in the fuel cell system and determines resolutions to fault conditions based upon the sensor data. For example, a first computing device 24 at a first plant (not shown in FIG. 3) may learn based on sensor data or operator input that one maintenance procedure or change in control settings is better suited for resolving a fault condition in a fuel cell than a different maintenance procedure or a different change in control settings. First computing device 24 communicates the learned procedure or settings change to a second computing device 24 in a second plant (second plant not shown in FIG. 3) using a communication interface 135. This process enables second computing device 24 to use the same procedure or the same change in response to the same or similar fault conditions being detected in the second power plant. In additional embodiments, computing device 24 generates recommendations of maintenance procedures to a user 125 based on the sensor data or other information.

In the exemplary embodiment, computing device 24 includes a human machine interface (HMI) 140 that includes a presentation interface 120 and a user input interface 130. Presentation interface 120 is coupled to processor 115 and presents information to user 125. In some embodiments, presentation interface 120 includes one or more display devices and presents visual data, such as images, 3D models, and more specific details on the fuel cells and stacks, to user 125. In the exemplary embodiment, user input interface 130 is coupled to processor 115 and receives input from user 125.

HMI 140 enables user 125 to view and respond appropriately to changing process conditions to ensure safe and reliable operation of fuel cell systems and fuel cell plants. For example, HMI 140 displays at least one process variable name, and associated with the process variable name, a real time variable value, a defined operating limit indicating a high limit or a low limit, and an operating margin. HMI 140 enables an at-a-glance comparison of the operating margin defined by the distance between the real time variable value and the operating limit. In some embodiments, HMI 140 incorporates color coding to easily indicate how close the process variable is to a predefined process limit. For example, a color coding "yellow" indicates that the process variable value is close or equal to the defined process limit, while the color coding "red" indicates that the process variable value is violating the limit. The operating limit is derived from plant model prediction and/or engineering judgment, and includes a process limit, a reliability limit, an operating limit, or a safe limit. For example, the operating limit includes one or more of (1) a process value, including, but not limited to, pressure, temperature, and flowrate, (2) a rate of change, including, but not limited to, temperature changing rate, power output changing rate, and gas composition changing rate, and (3) a distance between two process values, such as, but not limited to, a difference between anode pressure and cathode pressure. The plant model describing the operating limit could be a physics-based model, an empirical model, a data-driven model, or a heuristic model. In some embodiments, the presentation of the operating margin includes trending plots with time, static and/or dynamic tables, and diagrams with animation.

In the exemplary embodiment, HMI 140 affects fuel cell plant operation based on a status of one or more operating margins. For example, in one embodiment, HMI 140 affects plant operation by using color-coding to indicate limit violations. In another embodiment, HMI 140 affects plant operation by indicating direct knobs to be operated to increase the operating margin. In still another embodiment, HMI 140 affects plant operation by proactively transmitting alerts, such as notes, SMS, alarms, and/or horn. In still another embodiment, HMI 140 affects plant operation by suspending a predefined operating sequence, or initiating an operation to a standby state, or even triggering an automatic shutdown.

Communication interface 135 is coupled to processor 115 and is configured to be coupled in communication with one or more other devices, such as one or more sensors or one or more computing devices 24, and to perform input and output operations with respect to such devices while performing as an input channel. Communication interface 135 receives data from and/or transmits data to one or more remote devices. For example, communication interface 135 of one computing device 24 transmits a signal to the communication interface 135 of another computing device 24. More specifically, computing device 24 uses communication interface 135 to transmit a resolution to a fault condition to one or more computing devices 24. In addition, computing device 24 uses communication interface 135 to receive one or more resolutions for fault conditions from the one or more computing devices 24. In some embodiments, communication interface 135 is a wireless interface.

Computing device 24 is used to facilitate operation of one or more fuel cell systems through a fuel cell control system, as shown in FIG. 2. In some embodiments, computing device 24 also includes sufficient computer-readable/executable instructions, data structures, program modules, and program sub-modules, to receive other data associated with measured values from other power plants and fuel cell control systems to facilitate overall fault management of fuel cells in power plants.

Figure 4:
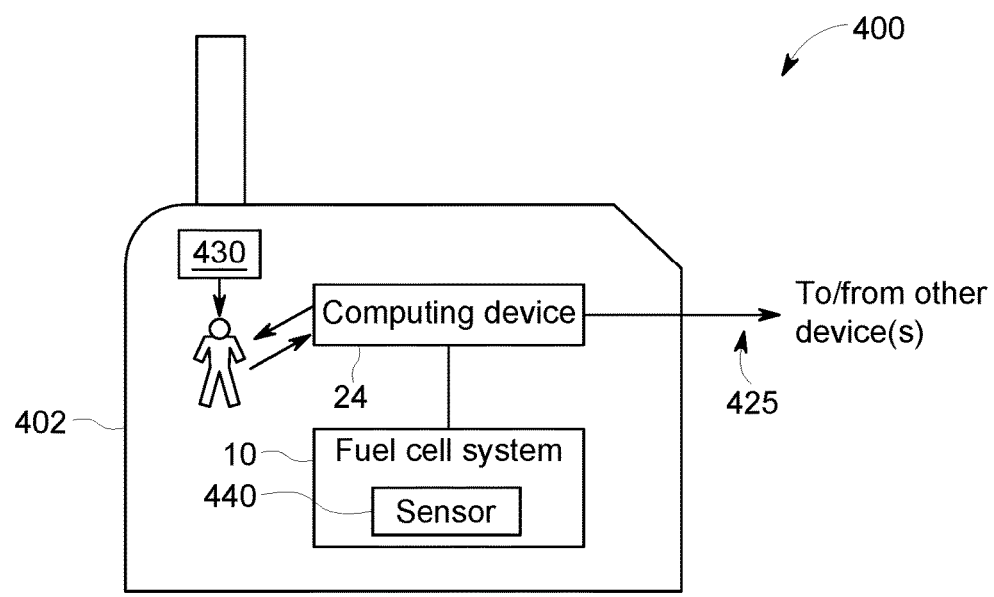
FIG. 4 is a block diagram of a portion of a distributed fault management system that includes a fuel cell system coupled to a fault management computing device shown in FIGS. 1 and 2.

FIG. 4 is a block diagram of a portion of a distributed fault management system 400 that includes fuel cell system 10 coupled to a computing device 24 (shown in FIGS. 1 and 2). In the exemplary embodiment, computing device 24 is a fault management computing device. System 400 includes sufficient computer-readable/executable instructions, data structures, program modules, and program sub-modules, to transmit and receive data from other systems to facilitate collaborating among computing devices 24 located in separate locations. For example, computing devices 24 may be located at separate power plants. Computing device 24 is a computer-based system that receives sensor data and generates one or more resolutions to fault conditions for fuel cell system 10. In the exemplary embodiment, computing device 24 is configured to execute monitoring algorithms and monitoring logic.

In the exemplary embodiment, computing device 24 is coupled to a network 425 via communication interface 135 (shown in FIG. 3). Computing device 24 is coupled to one or more additional computing devices 24 (additional computing devices 24 not shown in FIG. 4) via network 425. In some embodiments, network 425 is a wireless network.

Computing device 24 interacts with operator 430, such as user 125 (shown in FIG. 3), via user input interface 130 and/or presentation interface 120 (shown in FIG. 3). In one embodiment, computing device 24 presents information about fuel cell system 10, such as variety of visual data, such as images, 3D models, videos, and procedures, to operator 430. For example, computing devices 24 present operational information to operators 430. As used herein, the term "operator" includes any person in any capacity associated with operating and maintaining fuel cell system 10, including, without limitation, shift operations personnel, maintenance technicians, and facility supervisors.

Computing device 24 includes or is coupled to input interface 130 and presentation interface 120 for inputting automated or manual operation commands to fuel cell system 10 while simultaneously receiving back information that enables operator 430 to monitor an operating state of fuel cell system 10 according to the operation commands. Computing device 24 controls the operation of a fuel cell system 10 in accordance with the operation commands, for example using control system 30. Computing device 24 includes processor 115 (shown in FIG. 3) for implementing a control strategy. In addition, computing device 24 transmits a monitoring signal, including an operation state of a fuel cell system, according to the operation command. For example, computing device 24 transmits a predetermined operation command to control system 30.

In the exemplary embodiment, fuel cell system 10 includes at least one sensor 440 coupled to computing device 24 through at least one input channel (not shown). The least one sensor 440 is located in, within, on, or otherwise attached to, at least one component of fuel cell system 10. Sensor 440 collects fuel cell measurements associated with, but not limited to, voltage, temperature, power, current, pressure, gas flow, concentration, and fuel data emanating from portions of fuel cell system 10. Sensor 440 may include, without limitation, a temperature sensor, a fuel sensor, a voltage sensor, a current sensor, and a power supply sensor. Sensor 440 may include power supply sensor 31, temperature sensor 55 or 59, current sensor 40, and fuel sensor 58 or 61, shown in FIG. 2. These fuel cell measurements may refer to multiple quantities local to individual cells, or quantities global to stacks of cells in fuel cell system 10. For example, in one embodiment, fuel cell system 10 includes one or more temperature sensors within a housing about the fuel cells. In another embodiment, fuel cell system 10 includes one or more fuel sensors configured to monitor for the presence of fuel within the housing. In still another embodiment, one or more sensors are configured to at least one of monitor current supplied to a load coupled with the terminals and monitor voltage of at least one of the fuel cells.

Sensor 440 produces sensor-signals dependent on the fuel cell measurements of fuel cell system 10 that are transmitted to computing device 24. Sensors 440 repeatedly, e.g., periodically, continuously, and/or upon request, transmit measurement data at the time of measurement. Computing device 24 is directly connected to fuel cell system 10 and receives and processes measurement data using monitoring algorithms and monitoring logic to detect and/or determine one or more fault conditions.

Computing device 24 is designed to operate with an artificial intelligence software program and/or machine learning software program. Computing device 24 is attached to fuel cell system 10 and interacts with its components. This enables computing device 24 to output data and commands to fuel cell system 10 and receive output data, requests, etc. from fuel cell system 10. Computing device 24 collects the sensor data and compiles the data. Computing device 24 is configured to automatically learn resolutions for fault conditions in as much detail as possible. Known techniques from data analysis are expected to be applicable here, including machine learning, cognitive systems, pattern recognition, cluster recognition (SVM clustering), genetic algorithms, heuristics, and big data analysis.

Computing device 24 uses artificial intelligence and/or machine learning to determine a resolution to the one or more fault conditions. In some embodiments, an artificial intelligence algorithm is implemented that learns from the sensor data and/or the operator input. It then governs resolution of fault conditions in fuel cell system 10. For example, computing device 24 is configured to learn, based on sensor data or operator input, that a maintenance procedure or a change in control settings is better suited for resolving a fault condition in a fuel cell than a different maintenance procedure or other changes in control settings. For example, a maintenance procedure may include increasing or decreasing the temperature in the housing. In another example, a change in control settings may include, for example, implementing a shutdown operation in response to the detection of fuel within the housing based on data received from a fuel sensor.

Computing device 24 device generates a resolution command signal based on the resolution to the one or more fault conditions. Computing device 24 transmits the resolution command signal across network 425. The resolution command signal is accessed by any device capable of accessing network 425 including, without limitation, other computing device(s) 24. The resolution command signal configures the other computing device(s) 24 to use the resolution to resolve a similar fault condition in a similar manner. More specifically, the resolution command signal includes instructions configured to change maintenance procedures and/or control settings of other computing devices 24.

Computing device 24 is also configured to receive, via network 425, resolution command signals from the other computing device(s) 24. The resolution command signal configures computing device 24 to use a specified resolution to resolve a same or a similar fault condition, as described herein.

Figure 5:
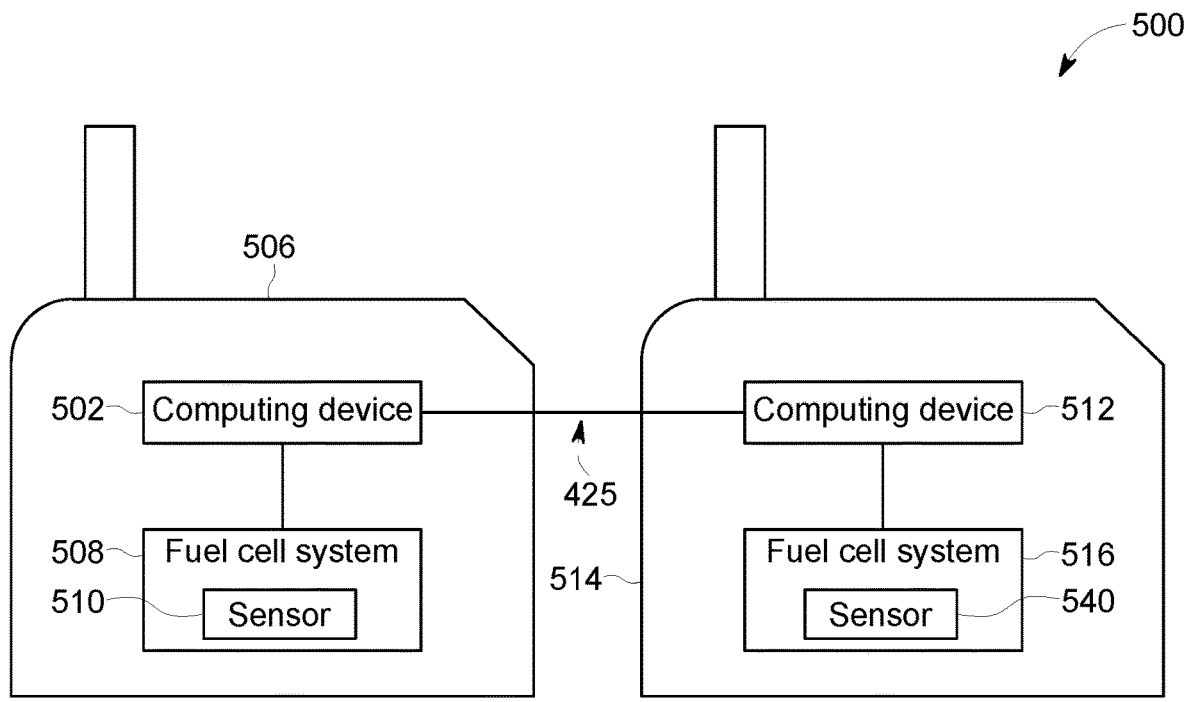
FIG. 5 is a block diagram of a portion of a distributed fault management system that includes a plurality of fuel cell systems coupled to fault management computing devices shown in FIGS. 1 and 2.

FIG. 5 is a block diagram of a portion of a distributed fault management system 500 that includes a plurality of fuel cell systems 508, 516 coupled to fault management computing devices 502, 512, respectively. Fuel cell systems 508, 516 are the same as fuel cell system 10. Fault management computing devices 502, 512 are the same as computing devices 24 described above. In the exemplary embodiment, computing device 502 is located at a first plant 506 and in communication with fuel cell system 508. Computing device 502 learns, based on sensor data from at least one sensor 510 or operator input, a resolution to a detected fault condition. For example, computing device 502 learns that a maintenance procedure or a change in control settings is better suited for resolving the fault condition than a different maintenance procedure or other change in control settings. Fault conditions in a fuel cell include, without limitation, leaking of fuel, a fault in an air fan, a fault in a refrigeration system, growth of a fuel crossover, and a fault in hydrogen pressure.

Upon learning the fault condition resolution, computing device 502 generates a resolution command signal based on the fault condition resolution. Computing device 502 communicates the resolution command signal via network 425 to computing device 512 in a second plant 514 to enable computing device 512 to use the same resolution procedure in response to detecting a same or similar fault condition detected in fuel cell system 516 in second plant 514. In some embodiments, computing device 502 further transmits instructions to computing device 512 to change maintenance procedures or control settings used by computing device 512 to resolve the same or similar fault condition. This enables distributed fault management for resolving fault conditions discovered at a variety of different locations.

Although only two computing devices 502 and 512, two fuel cell systems 508 and 516, one network 425, and two plants 506 and 514 are shown in the exemplary embodiment in FIG. 5, system 500 may include any number of computing devices, fuel cell systems, networks, and plants, and function as described herein.

Figure 6:
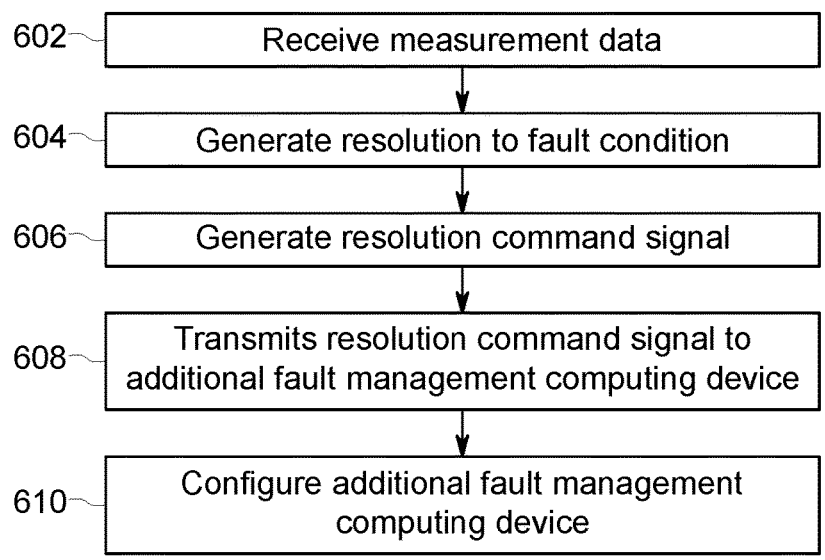
FIG. 6 is a schematic view of an exemplary method for distributed fault management using a plurality of fuel cell systems.

FIG. 6 is a schematic view of an exemplary method 600 for distributed fault management using a plurality of fuel cell systems 10 (shown in FIG. 1). Method 600 includes at least one first fault management computing device 24 and at least one sensor 440 coupled to first fault management computing device 24. Sensor 440 is associated with fuel cell system 10. First fault management computing device 24 receives 602 measurement data from sensor 440. The measurement data includes data associated with at least one fault condition. First fault management computing device 24 generates 604 a resolution to the at least one fault condition in fuel cells and fuel cell components using machine learning. First fault management computing device 24 communicates the fault condition resolution to at least one second fault management computing device 24, typically located in remote locations. More specifically, first fault management computing device 24 generates 606 at least one resolution command signal based on the resolution to the at least one fault condition. First fault management computing device 24 transmits 608 the at least one resolution command signal to second fault management computing device 24. The resolution command signal configures 610 second fault management computing device 24 to use the resolution to resolve a similar fault condition in a similar manner.

The above described fuel cell fault management system provides a system and method for distributed fault management using a plurality of fuel cell systems to overcome a number of deficiencies of known fuel cell fault management systems and provide a cost-effective method for managing fault conditions on such fuel cell systems. Specifically, the embodiments described herein include fuel cell systems associated with fault management computing devices. A fault management computing device includes a memory and a processor in communication with a fuel cell system and a communication network. The fault management computing device is configured to use artificial intelligence and/or machine learning to determine resolutions to fault conditions detected in fuel cells and fuel cell components, and communicate the fault condition resolution as a resolution command signal to a plurality of fault management computing devices. The resolution command signal configures the plurality of fault management computing devices to use the fault condition resolution to respond to a same or a similar fault condition when detected in fuel cell systems. Therefore, the embodiments described herein enable fuel cell systems to dynamically and adaptively resolve fault conditions and share resolutions to the fault conditions with other fuel cell systems, thereby improving the performance of some partially failed fuel cells.

An exemplary technical effect of the methods, systems, and apparatus described herein includes at least one of: (a) increasing the reliability of power sources in industrial facilities; (b) providing electric power with a fuel cell system that increases supply-independence, availability, efficiency, reliability, and decreases emissions over that of conventional power generation systems; (c) enabling distributed artificial intelligence and/or machine learning for solving fault conditions detected at a variety of different locations; (d) avoiding the same or similar fault conditions in multiple locations from repeatedly occurring by collaborating among the fuel cell systems in different locations; and (e) improving the performance of partially failed fuel cells by quickly and automatically resolving fault conditions.

Exemplary embodiments of methods, systems, and apparatus for fault management using a plurality of distributed fuel cell systems are not limited to the specific embodiments described herein, but rather, components of systems and/or steps of the methods may be utilized independently and separately from other components and/or steps described herein. For example, the methods may also be used in combination with other power generation systems requiring high reliability, and are not limited to practice with only the systems and methods as described herein. Rather, the exemplary embodiment can be implemented and utilized in connection with many other applications, equipment, and systems that may benefit from fault management using distributed systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel cell distributed fault management system comprising:
   a fuel cell system comprising a fuel cell,
   a fuel cell system sensor configured to continuously transmit sensor measurement data detected from the fuel cell system;
   a first fault management computing device configured to execute a monitoring logic to detect one or more fault conditions associated with an air system, a fuel system, or a refrigeration system of the fuel cell system that is directly connected to the fuel cell system, coupled to the fuel cell system sensor, and configured to:
     receive the sensor measurement data from multiple measured values selected from the group consisting of a voltage, a temperature, a power, a current, a pressure, a gas flow, a concentration, and a fuel from the fuel cell system sensor, wherein the sensor measurement data is associated with a first fault condition;
     automatically in real-time learn that a maintenance procedure or a control setting is better suited for resolving the first fault condition than a different maintenance procedure or a different control setting and generate a resolution to the first fault condition;
     automatically in real-time generate a resolution command signal based on the resolution to the first fault condition; and
     communicate the resolution command signal to a second fault management computing device,
     wherein the second fault management computing device is configured to receive the resolution command signal from the first fault management computing device,
     wherein the resolution command signal consists essentially of instructions configured to change the maintenance procedure or the control setting of the second fault management computing device in order to change the one or more measured values or implement a shutdown operation, and
     a processor to execute the resolution command signal and automatically in real-time resolve a second fault condition of the fuel cell that is detected by the fuel cell system sensor to be similar to the first fault condition in a similar manner as to the first fault condition in order to improve or shutdown performance of the fuel cell.

2. The distributed fault management system in accordance with claim 1, wherein the first fault management computing device is further configured to automatically learn and generate the resolution to the first fault condition using a machine learning method and an artificial intelligence method.

3. The distributed fault management system in accordance with claim 2, wherein the first fault management computing device is further configured to learn using the machine learning method, the artificial intelligence method, and the sensor measurement data, of a maintenance procedure and a control setting configured to at least partially resolve the first fault condition.

4. The distributed fault management system in accordance with claim 1, wherein the first fault management computing device and the second fault management computing device are geographically separated.

5. The distributed fault management system in accordance with claim 1, wherein the first fault management computing device further comprises a display device, wherein the first fault management computing device is further configured to display visual data, images, 3D models, videos, procedures, and details of the fuel cell system.

6. The distributed fault management system in accordance with claim 1, wherein the first fault management computing device is further configured to receive a resolution command signal from the second fault management computing device, wherein the resolution command signal configures the first fault management computing device to use a resolution to resolve an associated fault condition in a predefined manner.

7. The distributed fault management system in accordance with claim 1, wherein the fuel cell system includes a plurality of solid oxide fuel cells.

8. The distributed fault management system of claim 1, wherein the instructions implement a shutdown operation.

9. The distributed fault management system of claim 1, wherein the instructions to implement a shutdown operation also change one or more of the measured values.

10. The distributed fault management system of claim 1, wherein the instructions to change one or more of the measured values includes a change in the voltage, power, current, pressure, gas flow, concentration, and fuel.

11. A method for controlling a fuel cell distributed fault management system, comprising:
receiving, by a first fault management computing device configured to execute a monitoring logic to detect one or more fault conditions associated with an air system, a fuel system, or a refrigeration system of the fuel cell system that is directly connected to a fuel cell system and coupled to a fuel cell system sensor, sensor measurement data continuously transmitting sensor measurement data from the fuel cell system,
wherein the sensor measurement data associated with a first fault condition is detected from the fuel cell system with multiple measured values selected from the group consisting of a voltage, a temperature, a power, a current, a pressure, a gas flow, a concentration, and a fuel, and
wherein the fuel cell system comprises a fuel cell;
automatically in real-time learning that a maintenance procedure or a control setting is better suited for resolving the first fault condition than a different maintenance procedure or a different control setting and automatically in real-time generating, by the first fault management computing device, a resolution to the first fault condition;
generating, by the first fault management computing device, a resolution command signal based on the resolution to the first fault condition; and
transmitting, by the first fault management computing device, the resolution command signal to the second fault management computing device, wherein the resolution command signal consists essentially of instructions configured to change the maintenance procedure or the control setting of the second fault management computing device to change the one or more measured values or implement a shutdown operation, executing the resolution command signal by a processor to automatically in real-time resolve a second fault condition of the fuel cell that is detected by the fuel cell system sensor to be similar to the first fault condition in a similar manner to the first fault condition, and
improving or shutting down performance of the fuel cell comprising the second fault condition.

12. The method in accordance with claim 11 further comprising generating, by the first fault management computing device, the resolution to the first fault condition using a machine learning method and an artificial intelligence method.

13. The method in accordance with claim 12 further comprising learning, by the first fault management computing device using the machine learning method, the artificial intelligence method, and the sensor measurement data, at least one of a maintenance procedure and a control setting configured to at least partially resolve the first fault condition.

14. The method in accordance with claim 11, wherein the first fault management computing device and the second fault management computing device are geographically separated.

15. The method in accordance with claim 11 further comprising displaying, by the first fault management computing device, visual data, images, 3D models, videos, procedures, and details of the fuel cell system.

16. The method in accordance with claim 11 further comprising receiving, by the first fault management computing device, a resolution command signal from the second fault management computing device, wherein the resolution command signal configures the first fault management computing device to use a resolution to automatically resolve an associated fault condition in a predefined manner.

17. The method for controlling a distributed fault management system of claim 11, wherein the instructions implement a shutdown operation.

18. The method for controlling a distributed fault management system of claim 11, wherein the instructions to implement a shutdown operation also change one or more of the measured values.

19. The method for controlling a distributed fault management system of claim 11, wherein the instructions to change one or more of the measured values includes a change in the voltage, power, current, pressure, gas flow, concentration, and fuel.

20. A non-transitory computer-readable storage medium having computer-executable instructions embodied thereon, wherein when executed by a first fault management computing device configured to execute a monitoring logic to detect one or more fault conditions associated with an air system, a fuel system, or a refrigeration system of the fuel cell system that is directly connected to a fuel cell system comprising a fuel cell, and further coupled to a fuel cell system sensor configured to continuously transmit sensor measurement data detected from the fuel cell system to a second fault management computing device, the computer-executable instructions cause the first fault management computing device to:
receive sensor measurement data with multiple measured values selected from the group consisting of a voltage, a temperature, a power, a current, a pressure, a gas flow, a concentration, and a fuel from the fuel cell system sensor, wherein the sensor measurement data includes data associated with a first fault condition;
automatically in real-time learn that a maintenance procedure or a control setting is better suited for resolving the first fault condition than a different maintenance procedure or a different control setting and generate a resolution to the first fault condition;

automatically in real-time generate a resolution command signal based on the resolution to the first fault condition; and transmit the resolution command signal to a second fault management computing device, wherein the resolution command signal consists essentially of instructions configured to change the maintenance procedure or the control setting of the second fault management computing device to change the one or more measured values or implement a shutdown operation, and execute the resolution command signal by a processor to automatically in real-time resolve a second fault condition of the fuel cell that is detected by the fuel cell system sensor to be similar to the first fault condition in a similar manner as to the first fault condition in order to improve or shutdown the performance of the fuel cell.

21. The non-transitory computer-readable storage medium of claim 20, wherein the computer-executable instructions further cause the first fault management computing device to automatically learn and generate the resolution to the first fault condition using a machine learning method and an artificial intelligence method.

22. The non-transitory computer-readable storage medium of claim 21, wherein the computer-executable instructions further cause the first fault management computing device to learn using the machine learning method, the artificial intelligence method, and the sensor measurement data, of a maintenance procedure and a control setting configured to at least partially resolve the first fault condition.

23. The non-transitory computer-readable storage medium of claim 20, wherein the first fault management computing device and the second fault management computing device are geographically separated.

24. The non-transitory computer-readable storage medium of claim 20, wherein the computer-executable instructions further cause the fault management computing device to display visual data, images, 3D models, videos, procedures, and details of the fuel cell system.

25. The non-transitory computer-readable storage medium of claim 20, wherein the computer-executable instructions further cause the first fault management computing device to receive a resolution command signal from the second fault management computing device, wherein the resolution command signal configures the first fault management computing device to use a resolution to resolve an associated fault condition in a predefined manner.

26. The non-transitory computer-readable storage medium having computer-executable instructions embodied thereon of claim 20, wherein the instructions implement a shutdown operation.

27. The non-transitory computer-readable storage medium having computer-executable instructions embodied thereon of claim 20, wherein the instructions to implement a shutdown operation also change one or more of the measured values.

28. The non-transitory computer-readable storage medium having computer-executable instructions embodied thereon of claim 20, wherein the instructions to change one or more of the measured values includes a change in the voltage, power, current, pressure, gas flow, concentration, and fuel.

* * * * *